(12) United States Patent  
Eiserloh et al.

(10) Patent No.: US 8,528,721 B2  
(45) Date of Patent: Sep. 10, 2013

(54) SORTING APPARATUS

(75) Inventors: Katrin Eiserloh, Wittingen (DE); Stefan Müller, Weenzen (DE)

(73) Assignee: Mettler-Toledo Garvens GmbH, Giesen (DE)

( * ) Notice: Subject to any disclaimer, the term of this patent is extended or adjusted under 35 U.S.C. 154(b) by 0 days.

(21) Appl. No.: 13/491,185

(22) Filed: Jun. 7, 2012

(65) Prior Publication Data

US 2012/0261231 A1    Oct. 18, 2012

Related U.S. Application Data

(63) Continuation of application No. PCT/EP2010/069168, filed on Dec. 8, 2010.

(30) Foreign Application Priority Data

Dec. 10, 2009    (EP) .................................... 09015332

(51) Int. Cl.
*B65H 29/00* (2006.01)

(52) U.S. Cl.
USPC ........................................ 198/360; 198/369.2

(58) Field of Classification Search
USPC .................. 198/360, 369.2, 369.7, 370.05
See application file for complete search history.

(56) References Cited

U.S. PATENT DOCUMENTS

| 4,307,800 A | 12/1981 | Joa |
| 6,564,928 B1 | 5/2003 | Darrou et al. |
| 6,739,445 B2 | 5/2004 | Armstrong |
| 7,156,238 B2 | 1/2007 | Elbersen |
| 7,600,643 B2 | 10/2009 | Georgitsis et al. |

FOREIGN PATENT DOCUMENTS

| EP | 0540148 A1 | 5/1993 |
| JP | 59-183445 U | 12/1984 |

*Primary Examiner* — Mark A Deuble
(74) *Attorney, Agent, or Firm* — Standley Law Group LLP

(57) ABSTRACT

A sorter device and sorting apparatus for use in a conveyor line, and a conveyor line including such a sorter device and sorting apparatus. A sorting apparatus may be used in a conveyor line with an inspection device, and may include an infeed device and an outfeed device to move the products to and from a sorter device with a sorting element that can be swiveled downward. The sorter device may be equipped with at least one guide element that is arranged at a vertical distance from the sorting element and acts from above to guide the transport direction of a product that is moved on the sorting element. The guide element may be connected to the sorting element and may be designed to swivel therewith. An optional take-along device may also be present.

30 Claims, 6 Drawing Sheets

SORTING APPARATUS

CROSS-REFERENCE TO RELATED APPLICATIONS

This application is a continuation under 35 USC §120 of PCT/EP2010/069168, filed 8 Dec. 2010 which is, in turn, entitled to benefit of a right of priority under 35 USC §119 from European patent application 09015332.1, filed 10 Dec. 2009. The content of each of these applications is incorporated by reference as if fully recited herein.

TECHNICAL FIELD

The present invention is directed to an apparatus for sorting out defective products in a conveyor line.

BACKGROUND

Apparatuses and methods for sorting out products are widely known. They may serve to segregate products that are not in conformance with the desired product properties. The term "product" is used in this context as a collective term for articles of all kinds, including in particular products that are already packaged. Especially in the pharmaceutical industry and in the food industry, such sorting methods are used with preference in order to ensure that downstream of the sorting apparatus only those products which conform to the properties desired by the manufacturer remain in the transport line.

Products that lack the specified properties are deflected off the conveyor path and arrive in a collection zone where they can be collected for example in holding bins. To identify the products to be sorted out or deflected, appropriate (negative) sorting criteria are set in accordance with the specified properties. Such sorting criteria can be weight defects (over- or underweight articles), packaging defects, contaminated products and other nonconformances. While traveling down the conveyor path, the products are inspected according to at least one of these sorting criteria. If a product fails under at least one of the given criteria, it will after this inspection be diverted from the conveyor path and separated.

Sorting apparatuses normally operate automatically in conjunction with inspection devices, i.e. devices that perform tests in accordance with a given sorting-out criterion. In other words, the testing in accordance with the given sorting criteria as well as the turning-away of the products to be separated occurs in an automated process, normally under the control of an electronic controller unit.

The state of the art offers a diversity of sorting apparatuses. A method and a device for the sorting of products are described for example in EP 1 798 180 A2, wherein the products are inspected according to at least two given sorting criteria and, in case one of the criteria is satisfied, are automatically deflected transverse to the transport direction towards a receiving area, wherein the deflecting force acts from a common center, independent of which of the criteria has been met and calls for the product to be deflected. Products to be separated are in this case directed to a receiving bin by means of a pusher which moves transverse to the transport direction.

In EP 0 540 148, a device and a method are described for the testing of the leak-tightness as well as for the automated weighing of tightly sealed pouches. Pouches with a defective seal are blown by an air stream into a receiving bin, using a sorter device which is arranged at the side of a conveyor line and supplied with compressed air.

The subject of testing the leak-tightness of sealed pouches is likewise addressed in EP 1 411 337 A1. Products failing the given criterion are transported to a receiving bin by means of a conveyor belt designed to swivel downwards in case of a rejected product.

In the sorting-out of products with the afore-described conventional methods such as using compressed air to direct a product in a desired direction or using a pusher to shove a product out of the conveyor path, a problem is encountered especially in the case of flat and/or light-weight products such as side-sealed pouches, in that the product is either not picked up by the air stream or, because of its light weight, is blown elsewhere instead of to the desired place. When using pushers, one encounters the problem that flat products in particular can jam up with the pusher and can thus, in a worst case, cause the processing line to stop.

Therefore, in order to allow defective products to be sorted out carefully and reliably, the sorting rate in apparatuses of this kind is limited.

If products are to be sorted out by means of a downward-tiltable sorting-out conveyor belt or by means of a downward-pivoting sorting flap, where the segregated products travel along the sorting-out conveyor belt or the sorting flap in order to drop into a receiving bin, the speed of the sorting-out operation is limited by the fact that a direct transfer of the product from the infeed conveyor to the outfeed conveyor, one or both of which could for example be belt conveyors, has to be avoided. In order to reduce the error rate in the sorting-out process, a sufficient amount of time has to be allowed for the product to remain on the downward-tiltable sorting-out conveyor belt or on the sorting flap in order to be reliably transported to the receiving bin.

It would be desirable, therefore, to provide a fast and reliable sorting apparatus which is free of the drawbacks of state-of-the-art devices.

SUMMARY

According to the invention, this task is solved by a sorter device, a sorting apparatus in a conveyor line, and by a conveyor line possessing certain features as described in more detail below.

A sorter device in a conveyor line includes a sorting element which, in the operating position of the apparatus, can be swiveled downward and further includes at least one guide element arranged with a vertical separation from the sorting element and, acting from above, guiding the transport direction of a product which can be moved over the sorting element. The at least one guide element is connected to the sorting element and designed to be tiltable together with the latter.

The at least one guide element, which guides the direction of transport from above, is the means whereby the defective products can slide and/or are transported downward into a receiving bin. This provides the capability for a failure-free operation even at extremely high speeds of the products being moved over the sorter device, so that an increased throughput of products can be achieved in a conveyor line that is equipped with the sorter device.

The width of the at least one guide element preferably corresponds to a part of the width of the sorting element. There is further a height-adjusting device, and the at least one guide element is connected to the height-adjusting device.

The downward-tiltable sorting element in an advantageous embodiment includes a sorter flap and is actuated in particular by a motor or by pneumatic means (e.g., a pneumatic cylinder). This sorter flap can in particular be profiled with a decreasing thickness over its length in the transport direction.

In a further preferred embodiment, the sorting element has a surface consisting of a polymer material with a low coefficient of friction. In particular, a sorting element in the form of a sorter flap can be made entirely out such a polymer material.

The guide element advantageously includes at least one guide flap, with a symmetric arrangement of two guide flaps being preferred. The sorting element and the at least one guide flap can have a fixed connection by means of a strut, wherein in particular the vertical distance between the sorting element and the guide flap is adjustable. As an alternative solution, the sorting element and the at least one guide flap can be linked through an articulated connection, wherein likewise in particular the vertical distance between the sorting element and the guide flap is adjustable. To realize this concept, the at least one guide flap is hinged at its upstream end relative to the transport direction, by way of a pivoting connection above the sorter device, to a holder device that is connected to the height-adjusting device.

When a defective product is present which needs to be sorted out, the at least one guide flap serves to deflect the product downward into a receiving bin. In other words, the product that is to be segregated is guided in the appropriate direction by the guide flap acting from above. In the pivoting action, the guide flap and the sorting element move in tandem with each other.

An apparatus for sorting out defective products includes a sorter device of the foregoing description with a downward-tiltable sorting element as well as an infeed device for bringing the products to the sorter device and an outfeed device for carrying the products away from the sorter device.

As a further improvement, the arrangement includes a take-along device whose width corresponds to a part of the width of the sorter device. At the side of the take-along device, a guide element is arranged which serves to guide from above the direction of movement of a product which can be carried along between the sorting element and the take-along device. The at least one guide element is vertically spaced apart from the sorting element, connected to the latter, and tiltable relative to the take-along device.

The term "width" in the present context is intended to mean the horizontal dimension perpendicular to the transport direction of the conveyor device.

The apparatus according to the invention ensures that the movement of the product is continuously guided. The take-along device provides positive assurance that if the product passes the criterion in regard to a desired property, it will reliably move past the sorting element to the outfeed device, and if the product fails the criterion, it will be reliably transferred to the downward-switched sorting element. In the latter case, the coordinated action of the take-along device and the at least one guide element located above the product ensures that the product to be segregated is safely diverted along the sorting element into an appropriate receiving bin. As a consequence, the sorting rate can be increased without causing a problem of compromising the reliability in the sorting-out of defectives, so that a substantially higher throughput of products can be achieved in comparison to the known state of the art. Thus, the limiting factor for the throughput of products in the conveyor line no longer lies in the potential failure rate in the sorting-out of defectives, since a product which has been detected as being defective is always reliably diverted out of the product stream.

The sorting apparatus in accordance with the invention is especially well suited for the sorting-out of flat objects, for example flat-edged pouches, also referred to as edge-sealed pouches. Such pouches are used in the food sector for example as package units for soups or spices. In the pharmaceutical industry, one finds edge-sealed pouches containing for example medicines in powder form. Even if the contents are unevenly distributed inside the pouches, there is always the assurance that they are taken along and, in the case of defectives, taken out.

Obviously, other packaged or unpackaged products of a less flat shape can also be handled by the sorting apparatus according to the invention. The functionality of a sorting apparatus can be adapted to different product shapes. An adaptation to applications in processing lines with multiple conveyor paths in connection with multi-path inspection set-ups is likewise possible.

Due to its compact and flexible design, the sorting apparatus can be incorporated into any conceivable processing line, and at different points in a processing line. It can be adapted to different conveyor widths and heights and can also be installed as a wash-down protected system.

The infeed device is preferably an infeed conveyor belt, and the outfeed device is an outfeed conveyor belt, wherein in particular each of the belts forms an endless loop.

In a particularly advantageous embodiment, the take-along device includes a belt carrier which is position-adjustable in the vertical direction, with a top-hugging conveyor belt whose surface has a high coefficient of friction. The top-hugging belt is configured in particular as a flat belt of a polymer material, specifically of a foamed plastic.

The top-hugging conveyor belt can extend in the direction of transport at least from the infeed device to the outfeed device. Its circumferential velocity is preferably matched to the circumferential velocities of the infeed belt and the outfeed belt.

This arrangement ensures a continuously guided movement of the product, where the products are kept at the desired traveling speed and prevented from changing their positions relative to each other. At the same time, it provides assurance that the products are handled gently.

Particularly preferred embodiments of the sorting apparatus include either a pneumatic or motor-actuated downward-pivotable sorting element in the form of a sorter flap which can have a profile of decreasing thickness over its length in the transport direction. However, as an alternative the sorting element can also include an analogously pivotable endless-loop conveyor belt.

Advantageously, the sorting element can have a surface consisting of a polymer material with a low coefficient of friction. In particular, a sorting element in the form of a sorter flap can be made entirely out such a polymer material.

In an advantageous further development, the guide element includes a guide flap, wherein preferred designs have two guide flaps, i.e. one on each side of the take-along device. In such an arrangement, the at least one guide flap which can be swiveled downward together with the sorting element can be shaped with a decreasing thickness over its length in the direction of transport, as can be found for example in switching flaps.

In case a defective product needs to be sorted out, the guide flaps serve the purpose of diverting the product in the downward direction into a receiving bin. In other words, the product to be sorted out is guided from above to move in the right direction. In the swivel action, the guide flap and the sorting element always move in tandem with each other.

The sorting element and the at least one guide flap can be joined together by a strut as a fixed connection, wherein the vertical distance between the sorting element and the guide flap is preferably adjustable. In such a case, the angle between the sorting element and the guide flap does not change when the two are swiveled together for the sorting-out of a product, as the sorting element and the guide flap are aligned essentially parallel to each other.

In an alternative embodiment, the sorting element and the at least one guide flap can be linked through an articulated connection, wherein in particular the vertical distance between the sorting element and the guide flap is adjustable. In this case, the angle between the sorting element and the guide flap can vary dependent on the spatial arrangement of the strut pivots and the swivel bearings in relation to each other when both are swiveled downward for the sorting out of a product.

In order to guide a rejected product at high speed and without jamming between the sorting element and the guide flap while the sorting element is in its downward-tilted position, the sorting element and the guide flap are arranged so that their vertical distance increases along the transport direction over the length of the guide flap.

A sorting apparatus according to the invention is realized in a conveyor line which is equipped with an inspection device that serves to verify whether or not a product meets given sorting-out criteria. The inspection device can in particular have the form of a dynamic balance, a device for determining the dimensions of the product, a device for determining the seal-tightness of the product packaging, and/or a device for inspecting the product in regard to the presence of foreign bodies in the product. The arrangement includes a controller device through which the sorter device can be actuated when triggered by the given sorting-out criteria.

To prevent vibrations generated by the sorting apparatus from propagating to the inspection device, it is advantageous if the sorting apparatus and the inspection device are arranged on separate chassis frames.

BRIEF DESCRIPTION OF THE DRAWINGS

Additional features and details of the invention will be apparent from the following description of exemplary embodiments and the schematically simplified drawings, wherein like reference numerals across the several views refer to identical or equivalent features, and wherein.

DETAILED DESCRIPTION OF EXEMPLARY EMBODIMENT(S)

Figure 1:
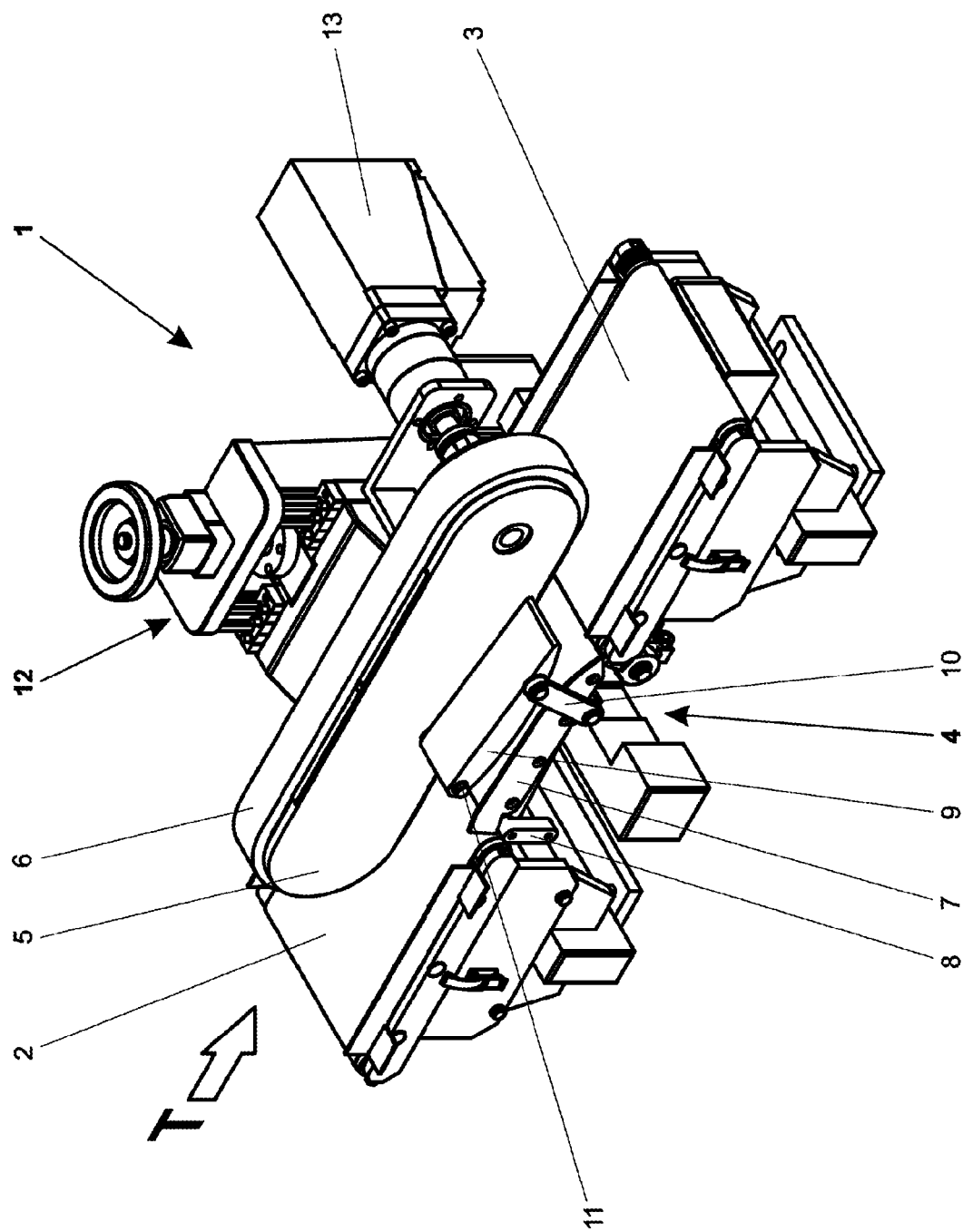
FIG. 1 shows an exemplary sorting apparatus in a perspective view with a sorting element in a closed position to allow a product to continue on a transport path from an infeed conveyor belt to an outfeed conveyor belt.

The drawing figures illustrate a sorting apparatus for segregating defective products out of a product stream. The products are preferably configured as flat edge-sealed pouches for example of the kind containing powdered soup or spices. However, the sorting apparatus is also suitable for taking other kinds of defective products out of a product stream. Placed ahead of the sorting apparatus is normally an inspection device (not shown in the drawings), which determines a desired property of the product and which, if a deviation from a given sorting-out criterion has been detected, triggers through a controller unit the activation of the sorting apparatus. The inspection device can be a dynamic balance for the determination of the weight of the product, or a device for measuring the dimensions of the product, or a device for determining the seal-tightness of the product packaging, or also a device for detecting contaminations in the product itself. Combinations of such inspection devices are also possible. The inspection device is not a subject of the invention and will therefore not be discussed in further detail.

Arranged downstream of the sorting apparatus is primarily a further conveyor belt on which the products that were not separated out are transported to further process stages.

The sorting apparatus 1 illustrated in FIG. 1 includes a sorter device 4 which is arranged between an infeed conveyor belt 2 and an outfeed conveyor belt 3. The infeed conveyor belt 2, which is located upstream of the sorter device 4, serves to receive the product that is about to enter the actual sorter device 4. The sorter device 4 includes a flap mechanism which works together with a take-along device. The transport direction is indicated by an arrow T.

The take-along device in the illustrated embodiment is configured as a belt carrier 5 with a top-hugging conveyor belt 6. This top-hugging conveyor belt 6 in the illustrated embodiment is configured as an endless conveyor belt loop of a soft, resilient polymer material, preferably a foamed plastic, and has a gripping, non-slip surface suitable to take along the products. An exemplary material that can be used for the top-hugging conveyor belt 6 is available for example from Ammeraal Beltech GmbH under the trade designations "PUS 220 blue" and "PUS035 red". The top-hugging belt is driven by a motor 13, so that the belt moves in the transport direction on the underside of the belt carrier 5 and against the transport direction on the topside of the belt carrier 5. By means of the height-adjusting device 12 the belt carrier 5 is height-adjustable in accordance with the product that is to be taken along by the top-hugging conveyor belt 6. As is evident from FIG. 1, the belt carrier 5 which holds the top-hugging conveyor belt 6 is of a lesser width than the infeed conveyor belt 2, the outfeed conveyor belt 3 and/or the sorter device 4 which is arranged between the belts 2 and 3.

The sorter device 4 includes a sorting element in the form of a sorter flap 7 which is held by a pivoting connection 8 near the exit of the infeed conveyor 2. When a product needs to be diverted, the downstream end of the sorter flap 7 can be pivoted downwards. As an alternative to a sorter flap, the sorting element can have an endless-loop conveyor belt which can be swiveled downwards when a product needs to be diverted.

Close to the downstream end of the sorter flap 7, a guide flap 9 is linked to the sorter flap 7, spaced apart from the latter. This connection can be realized with a strut 10 which is either rigidly fastened at its ends to the sorter flap 7 and the guide flap 9, or through pivoting joints at both ends of the strut 10. The guide flap 9 and a further guide flap which is not visible in FIG. 1 and which is located behind the belt carrier 5 in FIG. 1 are arranged on the sides of the belt carrier 5, so that the guide flaps and the belt carrier 5 take up the entire width of the sorter flap 7. Both guide flaps 9 are at their upstream ends pivotally connected to the sides of the belt carrier 5 by way of a swivel pivot 11. The distance of the guide flaps 9 from the belt carrier 5 is narrow, on the order of only a few millimeters.

Figure 2:
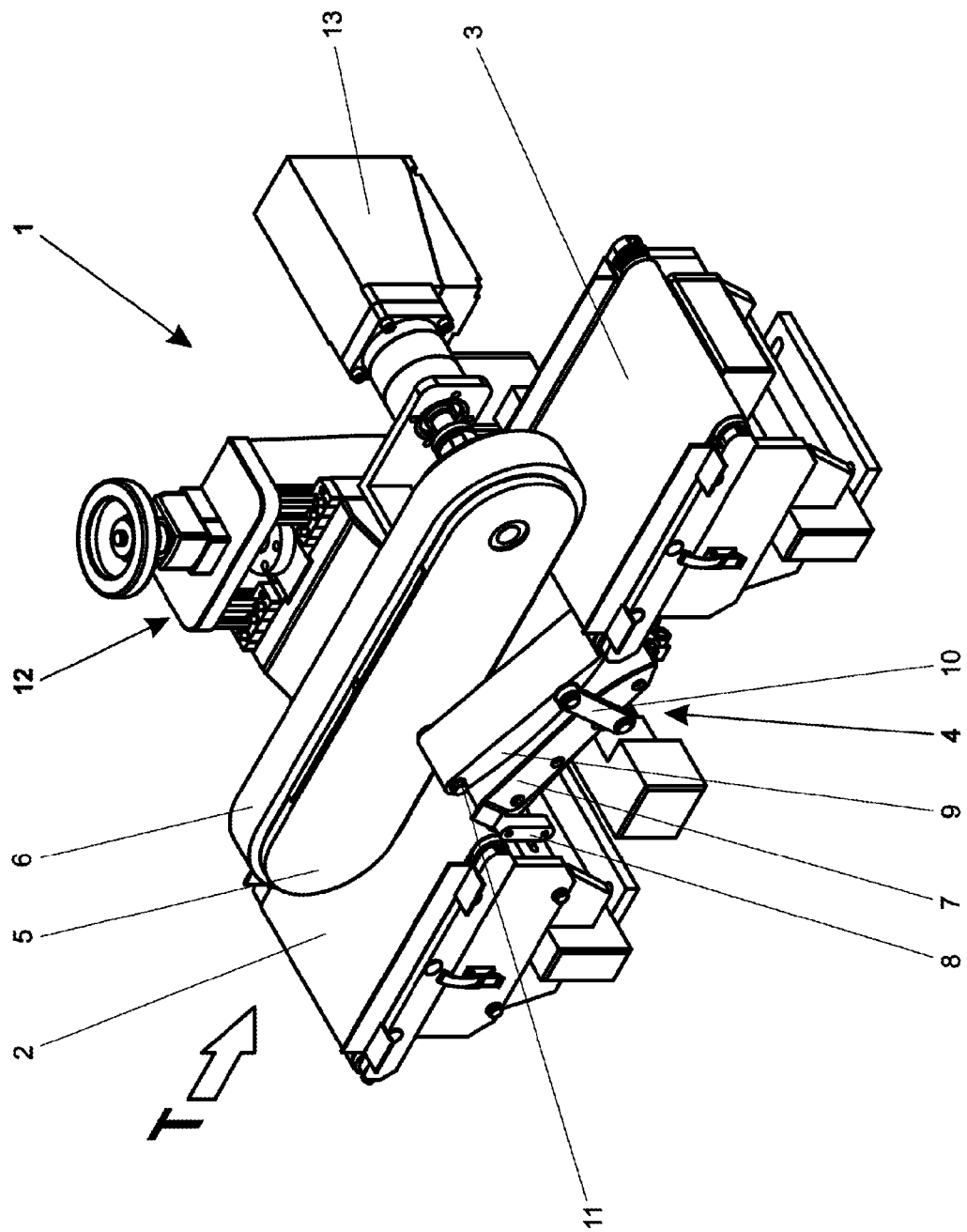
FIG. 2 shows the sorting apparatus of FIG. 1 with the sorting element in an open state so that a product that needs to be segregated is diverted out of the product stream.

Due to the connection between the guide flaps 9 and the sorter flap 7 by way of the struts 10, the guide flaps 9 are swiveled downwards together with the sorter flap 7 when a product is to be diverted, as is illustrated in FIG. 2. The product that is to be diverted is now lying on the sorter flap 7 and below the guide flaps 9 and glides along the flaps into a container (not shown) which is located below the sorter device 4. The sorter flap 7 and the guide flaps are preferably made of a polymer material, for example polyethylene terephthalate, and have a surface with a low coefficient of friction which is achieved through the addition of a solid lubricant. In principle, these elements of the sorter device 4 can also be made of metal and coated with a plastic surface.

Figure 3:
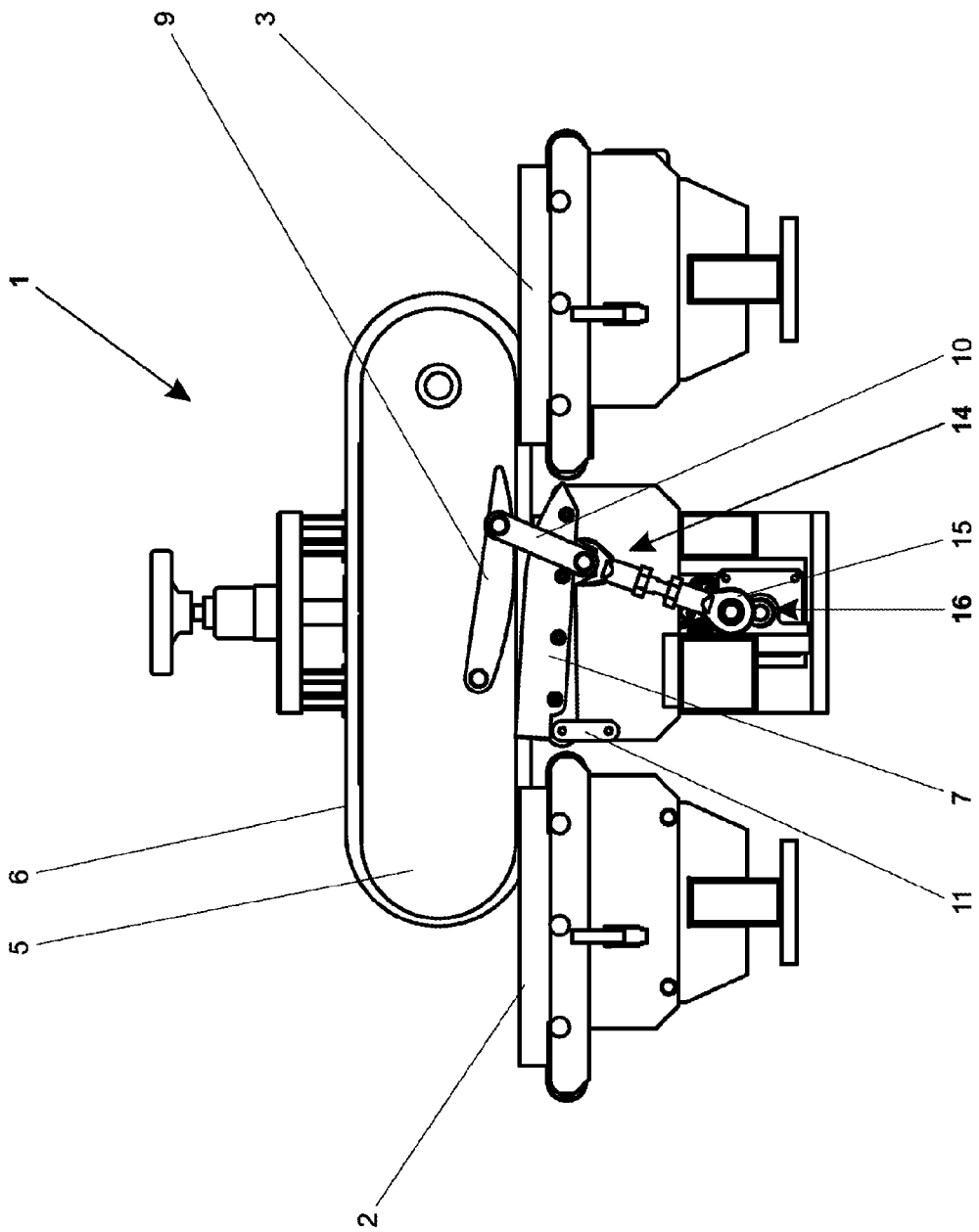
FIG. 3 shows the sorting apparatus of FIG. 1 from the side with the viewing direction perpendicular to the direction of transport.

Arranged below the sorter flap 7 and connected to the latter is a swivel mechanism which serves to open and close the sorter flap. As FIG. 3 illustrates in a side view of the sorting apparatus 1, this mechanism can be a rod 14 with swivel pivots 15 and an eccentric connection 16 that is driven by an electric motor. As an alternative, the swivel mechanism could also be actuated directly by means of a pneumatic cylinder. In principle, any swivel mechanism known to those of ordinary skill in the relevant technical field can be used for this purpose as long as it can be actuated sufficiently fast to meet the specified requirements for product throughput. It should be mentioned here that a product throughput of 300 articles per minute or even more can be achieved without a problem.

Following is an explanation of how the sorting apparatus works. A product stream coming from an inspection device consists of individually separated articles which are brought on the infeed conveyor belt 2 to the sorter device 4 and are gripped by the top-hugging conveyor belt 6 running on the belt carrier 5. Due to the gripping non-slip surface of the top-hugging belt 6, the articles are taken along to and moved across the sorter flap 7. At the same time, while the resilience of the material of the top-hugging belt provides a better grip on the products, it also ensures a gentler handling of the products.

When a product moves over the sorter flap 7, it passes at least in part through the space below the guide flaps 9 which are arranged at the sides of the belt carrier 5. In the case of a passing product, the latter does not come into contact with the guide flaps 9. In case of a rejected product that needs to be segregated, the sorter flap 7 and the guide flaps 9 together are swiveled downward about their respective pivots 8, 11, so that the diverted product can slide downward under its own gravity into a receiving bin. In their downward-swiveled position, the outgoing ends of the sorter flap 7 and of the guide flaps 9 are located at a lower level than the topside of the outfeed conveyor belt 3. To further ensure that a rejected product is indeed diverted, i.e. that the top-hugging conveyor belt 6 cannot accidentally take it along to the outfeed conveyor belt 3, the downstream end portion of the topside of the sorter flap 7 is slanted downward. In other words, the longitudinal profile of the flap decreases in thickness along the direction of transport.

The guide flaps 9 are shaped similarly in that their lengthwise profile likewise decreases in thickness in the transport direction, with the downstream end portion of the underside of the guide flaps 9 being slanted upwards. This design of the elements that guide the rejected products to a receiving bin additionally facilitates the expulsion of the product and also prevents products from running askew and becoming jammed up during the expulsion.

Figure 4:
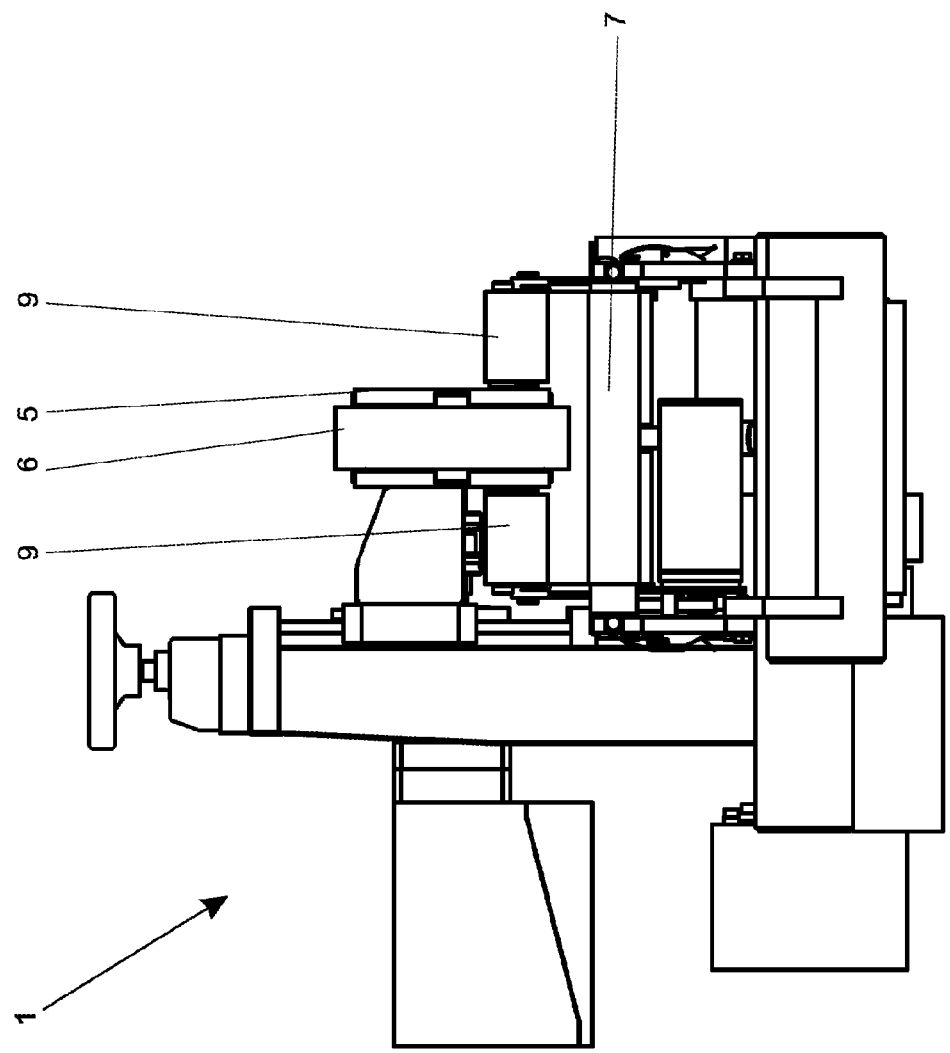
FIG. 4 is an end view of the sorting apparatus of FIG. 1, viewed in the transport direction.

In FIG. 4, the sorting apparatus 1 is shown in an elevation drawing seen in the transport direction, with the same embodiment of the sorter device as in FIGS. 1 to 3. As can be seen in this view, there are two guide flaps 9 arranged, respectively, on the left side and on the right side of the belt carrier 5 with the top-hugging conveyor belt 6.

Figure 5:
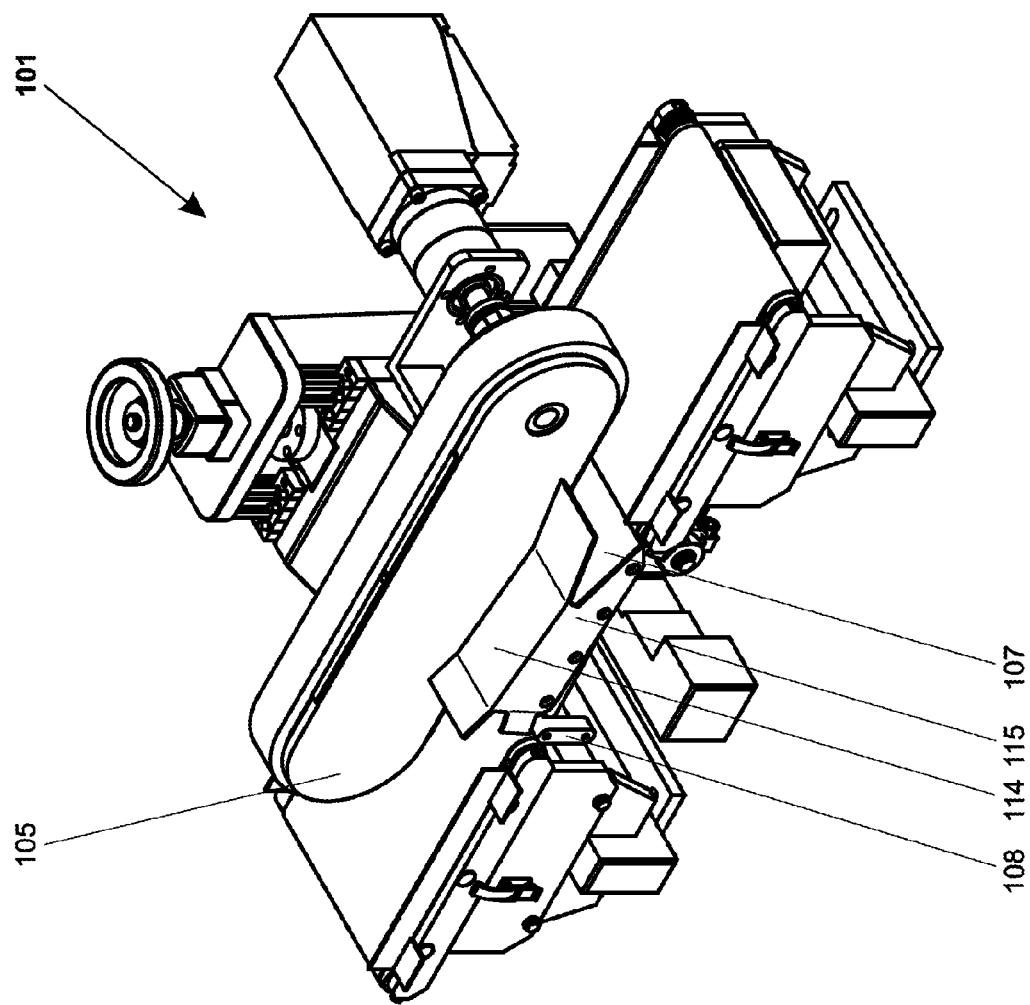
FIG. 5 is a perspective view of another exemplary sorting apparatus having an alternative embodiment of a sorter device.

FIG. 5 shows an alternate exemplary embodiment of a sorting apparatus 101 in a perspective view. Instead of the two guide flaps, upper guide parts 114 on both sides of the belt carrier 105 are rigidly connected through side supports 115 to the sorter flap 107 and thus participate in the swivel movement of the latter about the pivoting connection 108. In a cross-sectional profile perpendicular to the transport direction, the sorter flap 107, the side supports 115 and the upper guide parts 114 together appear in the shape of the letter C in supine position with both free ends closed inwards. The belt carrier 105 reaches down into the remaining gap at the top of the rotated C-profile. This embodiment has the advantage of simplicity in its design. With the sorting element being enclosed all around, one can also expect a decreased tendency of the sorting element to collect dirt.

Figure 6:
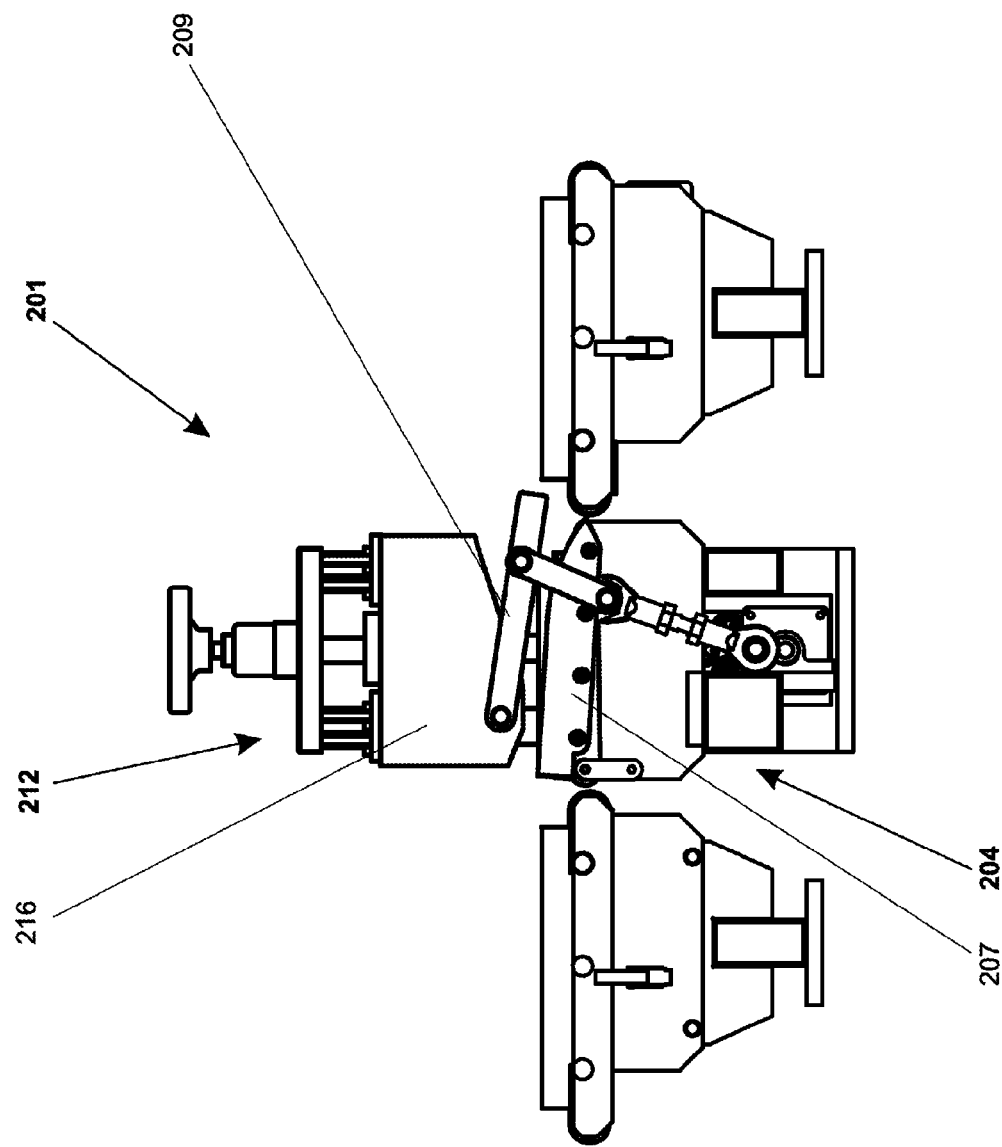
FIG. 6 shows the sorting apparatus of FIG. 5 from the side with the viewing direction perpendicular to the direction of transport.

FIG. 6 illustrates a further exemplary embodiment of a sorting apparatus 201 of the invention in a view from the side. Depending on the product to be transported and on the conveyor speed, it may be possible to realize this embodiment without a take-along device of the kind shown in FIGS. 1 to 5. The sorter device 204, like the devices shown in FIGS. 1 to 5, includes a downward-tiltable sorter flap 207 and at least one guide flap 209 arranged at a vertical distance from the sorter flap 207 and designed to tilt together with the latter. The guide flap 209 in the illustrated embodiment is shaped with an approximately constant thickness over its length. The pivoting connection of the at least one guide flap 209—particularly in the case of two guide flaps—is arranged on a holder device 216 which is connected to the height-adjusting device 212 and which preferably reaches from above into the space over the sorter device 204. The upstream end of the at least one guide flap 209 is in this case pivotally connected to the holder device 216.

Obviously, a sorter device of the kind shown in FIG. 6 can also be equipped with a guide element in accordance with FIG. 5. Also, the sorting element can be a downward-tiltable sorting-out conveyor belt of the kind mentioned above.

The sorter device and the sorting apparatus according to the invention have been described and illustrated in exemplary embodiments. However, relying on the teachings of this invention, those skilled in the relevant art will also be able to realize further variants. Therefore, while certain embodiments of the present invention are described in detail above, the scope of the invention is not to be considered limited by such disclosure, and modifications are possible without departing from the spirit of the invention as evidenced by the following claims:

What is claimed is:

1. A sorter device for use in a conveyor line, comprising:
   a sorting element which, while in its operating position, is capable of being swiveled downward; and
   at least one guide element in the form of at least one guide flap arranged at a vertical distance from the sorting element and configured to guide, from above, the transport direction of a product that is moved on the sorting element, the at least one guide flap connected to the sorting element and adapted to swivel together with the sorting element.

2. A sorter device according to claim 1, wherein the width of the at least one guide flap corresponds to a part of the width of the sorting element.

3. A sorter device according to claim 1, further comprising a height-adjusting device connected to the at least one guide flap.

4. A sorter device according to claim 1, wherein the sorting element comprises a sorter flap that is actuated by a device selected from the group consisting of a motor and a pneumatic cylinder.

5. A sorter device according to claim 4, wherein the sorter flap has a lengthwise profile of decreasing thickness in the transport direction.

6. A sorter device according to claim 1, wherein the sorting element has a surface consisting essentially of a polymer material with a low coefficient of friction.

7. A sorter device according to claim 1, wherein the sorting element comprises a sorter flap that is made entirely of a polymer material with a low coefficient of friction.

8. A sorter device according to claim 1, wherein the sorting element and the at least one guide flap are rigidly connected to each other by means of a strut, and the vertical distance between the sorting element and the at least one guide flap is adjustable.

9. A sorter device according to claim 1, wherein the sorting element and the at least one guide flap are linked together by an articulated connection, and the vertical distance between the sorting element and the at least one guide flap is adjustable.

10. A sorter device according to claim 1, wherein the at least one guide flap is pivotally connected at an upstream end relative to the transport direction and at a location above the sorter device, to a holder device, which is connected to a height-adjusting device that is connected to the at least one guide element.

11. A sorter device according to claim 1, wherein the vertical distance between the sorting element and the at least one guide flap increases in the transport direction over the length of the at least one guide flap.

12. A sorter device according to claim 1, wherein the at least one guide flap comprises two symmetrically arranged guide flaps.

13. A sorting apparatus comprising:
the sorter device of claim 1;
an infeed device for carrying products to the sorter device; and
an outfeed device for carrying products away from the sorter device.

14. A sorting apparatus for use in a conveyor line, comprising:
a sorter device with a sorting element which, when in the operating position, is capable of being swiveled downward;
an infeed device for carrying products to the sorter device;
an outfeed device for carrying products away from the sorter device;
a take-along device whose width corresponds to a part of the width of the sorter device; and
at least one guide element that is arranged at the side of the take-along device, the at least one guide element being vertically spaced apart from the sorting element but connected thereto and capable of being swiveled relative to the take-along device, and configured to guide, from above, the transport direction of a product that is moved between the sorting element and the take-along device.

15. A sorting apparatus according to claim 14, wherein the infeed device comprises an infeed conveyor belt and the outfeed device comprises an outfeed conveyor belt, and wherein each of said conveyor belts is an endless-loop conveyor belt.

16. A sorting apparatus according to claim 14, wherein the take-along device comprises a belt carrier with a top-hugging conveyor belt having a surface with a high coefficient of friction.

17. A sorting apparatus according to claim 16, wherein the top-hugging conveyor belt is configured as a flat belt of a foamed plastic polymer material.

18. A sorting apparatus according to claim 16, wherein the top-hugging conveyor belt extends in the direction of transport at least from the infeed device to the outfeed device and has a circumferential velocity that is matched to circumferential velocities of the infeed device and the outfeed device.

19. A sorting apparatus according to claim 14, wherein the sorting element comprises a sorter flap that is actuated by a device selected from the group consisting of a motor and a pneumatic cylinder.

20. A sorting apparatus according to claim 19, wherein the sorter flap has a longitudinal profile of decreasing thickness in the transport direction.

21. A sorting apparatus according to claim 14, wherein the sorting element has a surface consisting essentially of a polymer material with a low coefficient of friction.

22. A sorting apparatus according to claim 14, wherein the sorting element comprises a sorter flap that is made entirely of a polymer material with a low coefficient of friction.

23. A sorting apparatus according to claim 14, wherein the at least one guide element comprises a guide flap.

24. A sorting apparatus according to claim 23, wherein the sorting element and the at least one guide flap are rigidly connected to each other by means of a strut, and the vertical distance between the sorting element and the at least one guide flap is adjustable.

25. A sorting apparatus according to claim 23, wherein the sorting element and the at least one guide flap are linked together through an articulated connection, and the vertical distance between the sorting element and the at least one guide flap is adjustable.

26. A sorting apparatus according to claim 23, wherein the vertical distance between the sorting element and the at least one guide flap increases in the transport direction over the length of the guide flap.

27. sorting apparatus according to claim 14, wherein the at least one guide element comprises two guide flaps, one on each side of the take-along device.

28. A conveyor line including the sorting apparatus of claim 14.

29. A conveyor line with an inspection device serving to verify whether or not a product meets given sorting-out criteria, comprising:
the sorter device of claim 1; and
a controller device through which the sorter device of claim 1 is actuatable when given sorting-out criteria are met;
wherein the inspection device is a device selected from the group consisting of one or a combination of a dynamic weighing scale, a device for determining the dimensions of the product, a device for determining the seal-tightness of the product packaging, and a device for inspecting the product in regard to the presence of foreign bodies in the product.

30. A conveyor line according to claim 29, wherein the sorter device is arranged on a frame that is separate from the frame of the inspection device.

* * * * *

UNITED STATES PATENT AND TRADEMARK OFFICE
CERTIFICATE OF CORRECTION

| | |
|---|---|
| PATENT NO. | : 8,528,721 B2 |
| APPLICATION NO. | : 13/491185 |
| DATED | : September 10, 2013 |
| INVENTOR(S) | : Eiserloh et al. |

It is certified that error appears in the above-identified patent and that said Letters Patent is hereby corrected as shown below:

In the Claims:

In column 10, line 44, please delete "27. sorting apparatus" and insert -- 27. A sorting apparatus --.

Signed and Sealed this
Twenty-second Day of October, 2013

Teresa Stanek Rea
*Deputy Director of the United States Patent and Trademark Office*